Dec. 2, 1930.    E. F. CARTER ET AL    1,783,904
SYSTEM OF DISTRIBUTION
Filed July 22, 1925
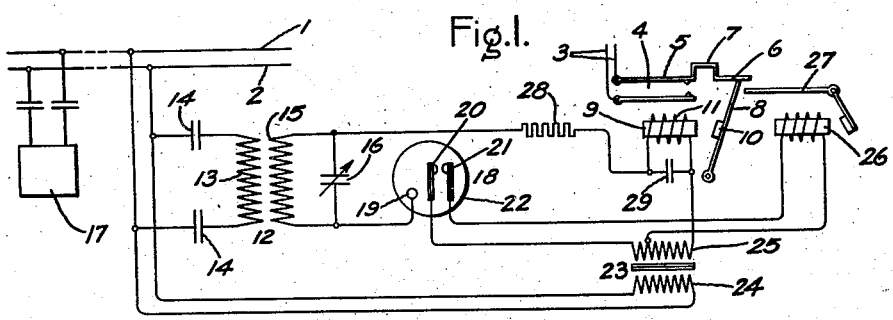
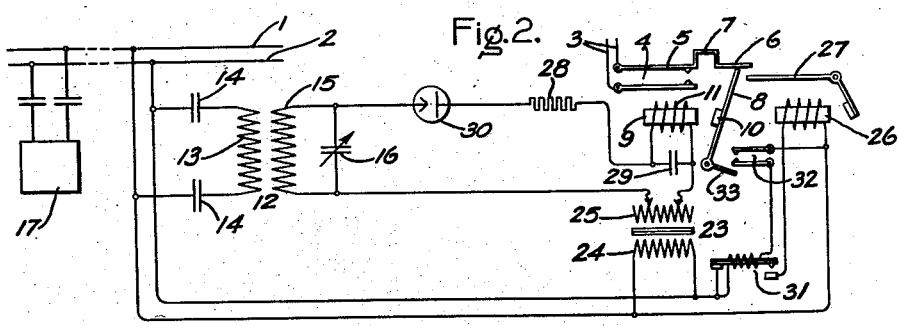
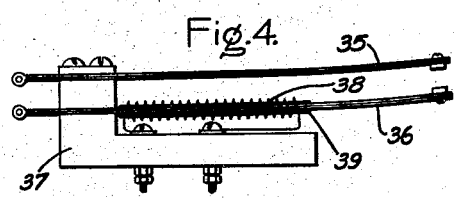
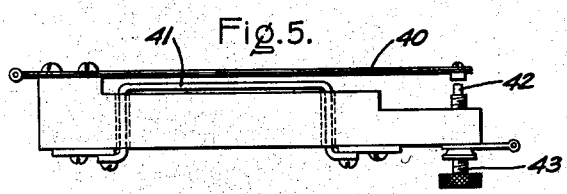
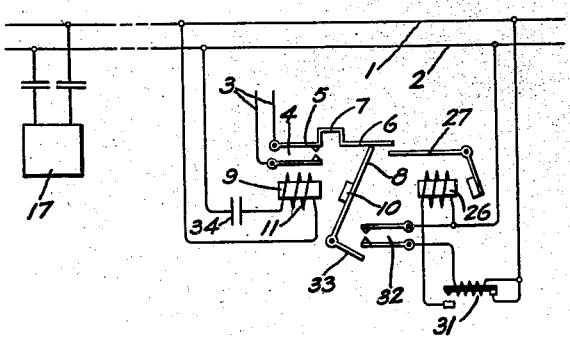
Inventors:
Emmett F. Carter,
Hugh E. Allen,
by
Their Attorney.

Patented Dec. 2, 1930

1,783,904

UNITED STATES PATENT OFFICE

EMMETT F. CARTER AND HUGH E. ALLEN, OF SCHENECTADY, NEW YORK, ASSIGNORS TO GENERAL ELECTRIC COMPANY, A CORPORATION OF NEW YORK

SYSTEM OF DISTRIBUTION

Application filed July 22, 1925. Serial No. 45,393.

Our present invention relates to a system of distribution and more particularly to means for controlling a distant circuit or switch from a central station or other suitable point without the employment of additional conductors between the station and remote point.

The object of our invention is to provide a simple and reliable means for controlling a remote circuit. We accomplish this object by the employment of a control circuit located at the distant point. The control circuit includes a relay and is adapted to be energized when current having a suitable, relatively high frequency is supplied to the distribution system. If the high frequency current is supplied to the control circuit for a relatively short period of time, the relay will be energized and will actuate a switch to close the remote circuit. The switch will remain closed due to an interlocking arrangement when current ceases to flow in the control circuit. When it is desired to open the controlled or remote circuit, high frequency current is again supplied to the control circuit but for a longer time than in the first instance. In the latter case a thermostatic device will be operated after a predetermined period of time to close a circuit for an auxiliary relay which will open the remote circuit.

The novel features which we believe to be characteristic of our invention are set forth with particularity in the appended claims. Our invention itself, however, both as to its organization and method of operation will best be understood by reference to the following specification taken in connection with the accompanying drawing in which Fig. 1 shows diagrammatically one circuit organization whereby our invention may be carried into effect; Figs. 2 and 3 show modified forms of our invention; and Figs. 4 and 5 show details of thermostatic relays which may be employed with the form of our invention shown in Figs. 2 and 3.

Referring particularly to Fig. 1 of the drawing, we have indicated at 1 and 2 a pair of power mains of a system of distribution. A normally open circuit 3 controlled by a switch 4 may be located at any point on the system. One of the contact arms 5 of switch 4 has an extension 6 and a recessed portion 7, and is normally held in open position by an arm 8 controlled by an electromagnet or relay 9. The relay 9 includes a soft iron armature member 10 and a winding 11. Current is supplied to a control circuit, which includes winding 11, by means of a transformer 12 having a primary winding 13 connected to the distribution system through coupling condensers 14, and a secondary winding 15, tuned by a condenser 16 to the frequency of the carrier current supplied to the distribution system by a transmitter 17.

Included in the control circuit is a discharge device 18 comprising two dissimilar electrodes 19 and 20, and an auxiliary electrode 21, enclosed in a receptacle 22. The receptacle 22 is filled with a suitable gas such as neon, or other inert gas at a definite pressure, the particular gas and the pressure being so chosen that if a certain definite potential is impressed on electrodes 19 and 20 a discharge will take place and current will flow between the two electrodes as long as the potential is maintained. Because of the dissimilar structure of electrodes 19 and 20, current will flow in the control circuit in one direction only.

A constant potential is impressed on the discharge device through a transformer 23, having a primary winding 24 connected to the system of distribution, and a secondary winding 25 included in the control circuit. The potential thus impressed upon the control circuit is chosen at a value somewhat below the value at which a discharge will take place between electrodes 19 and 20. When high frequency current is received from the transmitter 17, and impressed upon the control circuit, the additional potential supplied by the received current will be sufficient to produce a discharge through the device 18, and cause a current supply from the secondary 25 to flow through the device 18 and through winding 11 as long as the high frequency current is received. Energization of winding 11 will move the arm 8 to the left of the position shown on the drawing and allow contact arm 5 to drop and close switch 4. When the high frequency current ceases to flow relay 9 will be deenergized, but switch 4 will remain closed due to the interlocking arrangement formed by recess 7 and arm 8.

One of the electrodes 20 of the discharge device is constructed of a thermostatic strip, and we make use of this arrangement for controlling the opening of the remote circuit. When it is desired to open the remote circuit, high frequency current is again supplied to the control circuit by transmitter 17, and relay 9 is energized as before. The heat produced by the glow discharge between electrodes 19 and 20 is utilized to heat the thermostatic electrode 20. When electrode 20 has been heated to a certain degree it bends over far enough to touch a third electrode 21, and close a circuit for an auxiliary relay 26 through a portion of secondary winding 25. Energization of relay 26 actuates a lever arm 27 to raise contact arm 5 and open switch 4. When the high frequency current ceases to flow, relay 9 will be deenergized, and arm 8 will be released and will be moved, either by its own weight, or by means of a spring, not shown, to the position illustrated on the drawing. Relay 26 will remain energized for a certain period of time after the high frequency current has ceased to flow, owing to the heat developed in the thermostatic element 20, and thus assure the release of arm 8 from the recess 7.

Electrode 21 is preferably made of thermostatic metal so that the distance between electrodes 20 and 21 will not be changed by variations in atmospheric temperature. When the tube glows the glow discharge takes place only against electrode 20. A resistance 28 and condenser 29 are inserted in the control circuit to make the time constant of the circuit such that high frequency surges will not cause operation of relay 9.

In Fig. 2 we have shown a modified form of our invention. In this figure we employ a standard type of discharge device 30 in the control circuit and actuate the auxiliary relay 26 by means of a separate thermostatic relay 31 controlled by contacts 32 from an extension 33 of arm 8. Operation of the device shown in this figure is similar to that shown in Fig. 1. A constant potential is impressed on the discharge device by the transformer 23. When high frequency current is received from transmitter 17, the additional potential supplied by the received current is sufficient to produce a discharge through device 30 and cause a current to flow from winding 25 through winding 11. Energization of winding 11 operates the arm 8 causing closure of switch 4 and contacts 32. Included in circuit with contacts 32 is the thermostatic relay 31. If the high frequency current is supplied for a short time only, relay 9 will be deenergized when the high frequency current ceases to flow, armature 10 will be released, and contacts 32 will be separated. Switch 4, however, will remain closed due to the interlocking action of recess 7 and arm 8.

When it is desired to open switch 4 high frequency current is again supplied to the control circuit and relay 9 is again energized. As in the first instance, contacts 32 will remain closed as long as the high frequency current is supplied to the control circuit. If the high frequency is maintained for a certain time, thermostatic relay 31 will operate to close a circuit for the auxiliary relay 26 to open switch 4 and contacts 32.

The form of our invention shown in Figs. 1 and 2 is suitable for operation at any frequencies. The form of our invention shown in Fig. 3, however, is adapted for audio frequencies only. In the latter figure relay 9 is connected to distribution mains 1 and 2 through a blocking condenser 34. The values of the capacity of condenser 34 and the inductance of the winding 11 are so chosen that when a relatively high frequency, as 500 cycles, is superimposed on the distribution system by transmitter 17, the circuit including winding 11 and condenser 34 will form a tuned circuit at that frequency. When a current impulse having that frequency is supplied to the distribution system, winding 11 will be energized and arm 8 will be moved so that it will enter recess 7 in contact arm 5, and allow the main switch 4 to close. At the same time the extension 33 will engage the contacts of the auxiliary switch 32 to close a circuit from the mains 1 and 2 to the winding of the thermostatic relay 31. If the high frequency current is of short duration, arm 8 will be moved, either by its own weight or by means of a spring, not shown, to the right hand portion of the recess 7 when the high frequency current ceases to flow. This action will permit the contacts of switch 32 to open. Switch 4, however, will remain closed due to the interlocking action of the slot 7 and the arm 8.

When it is desired to open switch 4, high frequency current is again superimposed on the distribution system by the transmitter 17, and the contacts of switch 32 are again closed by arm 8 and extension 33 to energize the thermostatic relay 31. If the high frequency current is maintained for a predetermined period of time the thermostatic element of relay 31 will engage a contact and close a circuit for relay 26. Energization of relay 26 will cause movement of lever 27 to raise the contact arm 5 and open switch 4 as in Fig. 2. When the high frequency current ceases to flow, relay 9 will be deenergized, and arm 8 will tend to move, due either to its own weight or to a spring, not shown, to the position illustrated in Fig. 4. Relay 26 will remain energized for a short period of time after the high frequency current ceases to flow, due to the heat developed by the thermostatic relay 31, and thus assure the release of arm 8 from the recess 7.

While the weight of contact arm 5 tends normally to close switch 4, a spring may be employed if desired to bias the switch arm towards closed position. Likewise lever 27 and arm 8 may be biased to the position shown in the various figures by means of suitable springs if desired.

In Figs. 4 and 5, we have shown two types of thermostatic switches which are adapted for use in a system such as shown in Fig. 2. In the arrangement shown in Fig. 4 contact arm 35, which cooperates with the thermostatic contact arm 36, is made of thermostatic metal in order to compensate for changes in atmospheric temperature. Both contacts are mounted on a block 37 carrying terminals for the heating coil 38 which is mounted on insulating material 39.

In the arrangement shown in Fig. 5 the strip 40 is of thermostatic metal and is so placed that when heated by means of a heater 41 it bends down and touches a stationary contact 42 to close a circuit for the auxiliary relay 26 as in Fig. 2. This type of relay is non-compensating for changes in atmospheric temperature and the time required for the contacts to close is dependent upon the amount of current passed through the heater and upon the distance between the heater element and the contact strip. The time required for the contacts to close may be varied by means of the screw device 43.

What we claim as new and desire to secure by Letters Patent of the United States, is:

1. The combination in a remote control system, an electric circuit associated with said system, means included in said system for closing said circuit in response to current of a certain frequency, thermostatic means for opening said circuit in response to current of said certain frequency, and mechanical means for maintaining said circuit closed.

2. The combination in a remote control system, an electric circuit associated with said system, a relay responsive to high frequency current included in said system for closing said circuit, and means including a time delay device for opening said circuit when said high frequency current has flowed for a predetermined period of time.

3. In combination, means adapted to control the operation of a remote circuit said means including a relay responsive to current of a certain frequency for effecting closure of said circuit, and means including a thermostat for automatically opening said circuit when current of said frequency is supplied to said relay for a predetermined period of time.

4. The combination in a remote control system, an electric circuit associated with said system, means for closing and opening said circuit in response to received high frequency current of a certain frequency, and means for maintaining said circuit closed, said current responsive means including an electric valve and a relay.

5. In combination, an electric circuit, means for controlling the closing of said electric circuit, said means including a control circuit containing a discharge device and a relay, a source of potential connected to said control circuit, the value of the potential being somewhat lower than that required to break down the discharge device and produce a flow of current in the control circuit, means for supplying to the control circuit, high frequency current and thereby impressing on the control circuit a potential great enough to cause current to flow therethrough from said source to energize said relay and close said electric circuit, means for maintaining said electric circuit closed and electromagnetic means controlled by said high frequency current for opening said electric circuit.

6. In combination, an electric circuit, means for controlling the closing of said electric circuit, said means including a control circuit containing a discharge device and a relay, a source of potential connected to said control circuit, the value of the potential being somewhat lower than that required to break down the discharge device and produce a flow of current in the control circuit, means for supplying to the control circuit, high frequency current and thereby impressing on the control circuit a potential great enough to cause current to flow therethrough from said source to energize said relay and close said electric circuit, means for maintaining said electric circuit closed, and means including a time relay for opening said electric circuit when said high frequency current has flowed for a predetermined period of time.

7. In combination, an electric circuit, means for controlling the closing of said electric circuit, said means including a control circuit containing a discharge device and a relay, a source of potential connected to said control circuit, the value of the potential being somewhat lower than that required to break down the discharge device and produce a flow of current in the control circuit, means for supplying to the control circuit high frequency current and thereby impressing on the control circuit a potential great enough to cause current to flow therethrough from said source to energize said relay and close said electric circuit, means for maintaining said electric circuit closed, and means for opening said electric circuit, said last mentioned means including an auxiliary relay and thermostatic means for controlling the operation of said auxiliary relay.

8. In combination, an electric circuit, means for controlling the closing of said electric circuit, said means including a control circuit containing a discharge device and a relay, a source of potential connected to said control circuit, the value of the potential being somewhat lower than that required to break down the discharge device and produce the flow of current in the control circuit, means for supplying to the control circuit high frequency current and thereby impressing on the control circuit a potential great enough to cause current to flow therethrough from said source to energize said relay and close said electric circuit, means for maintaining said electric circuit closed, and means responsive to the flow of current in said control circuit for opening said electric circuit.

9. The combination, in a remote control system, a receiving circuit, an electric switch arranged to remain in the position to which it was last operated, means responsive to a current impulse received from a remote point of a certain duration for operating said switch to one position, and thermal responsive means controlled by an impulse received from said remote point of a longer duration for operating said switch to a different position.

10. In combination, in a remote control system, an electric switch, a receiving circuit tuned to respond to current of a certain frequency, means responsive to a current impulse received in said circuit of a certain duration for operating said switch to one position, and thermal responsive means controlled by an impulse received in said circuit of a longer duration for operating said switch to another position.

11. In combination, a switch having two positions, a thermostatic element, means for operating said switch to one of said positions, said means comprising means for supplying current to said thermostatic element, and means responsive to said thermostatic element for operating the switch to the other position when current is supplied to said thermostatic element for a predetermined interval longer than that required to operate said switch to said first position.

In witness whereof, we have hereunto set our hands this 21st day of July, 1925.

EMMETT F. CARTER.
HUGH E. ALLEN.